US012621028B2

(12) United States Patent
Sun et al.

(10) Patent No.: US 12,621,028 B2
(45) Date of Patent: May 5, 2026

(54) TYPE II PORT SELECTION CODEBOOK ENHANCEMENTS

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Huaning Niu, San Jose, CA (US); Ismael Gutierrez Gonzalez, San Jose, CA (US); Oghenekome Oteri, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 431 days.

(21) Appl. No.: 18/247,190

(22) PCT Filed: Oct. 2, 2020

(86) PCT No.: PCT/CN2020/119796
§ 371 (c)(1),
(2) Date: Mar. 29, 2023

(87) PCT Pub. No.: WO2022/067862
PCT Pub. Date: Apr. 7, 2022

(65) Prior Publication Data
US 2023/0379030 A1 Nov. 23, 2023

(51) Int. Cl.
*H04B 7/06* (2006.01)
(52) U.S. Cl.
CPC ................................. *H04B 7/0626* (2013.01)

(58) Field of Classification Search
CPC .. H04B 7/0417; H04B 7/0626; H04B 7/0632; H04B 7/0639; H04L 25/0204; H04L 25/0224; H04L 5/0051
See application file for complete search history.

(56) References Cited

U.S. PATENT DOCUMENTS

2017/0026953 A1* 1/2017 Wang ..................... H04B 7/066
2017/0047976 A1* 2/2017 Noh ..................... H04B 7/0695
(Continued)

FOREIGN PATENT DOCUMENTS

CN 107005293 8/2017
CN 110476391 11/2019
(Continued)

OTHER PUBLICATIONS

Moderator (Samsung), "Summary of offline email discussion on [100e-NR-eMIMO-MUCSI-01] follow up", 3GPP TSG RAN WG1 #100bis, R1-2002137, Apr. 30, 2020, 7 sheets.

*Primary Examiner* — Benjamin H Elliott, IV
(74) *Attorney, Agent, or Firm* — Fay Kaplun & Marcin, LLP

(57) ABSTRACT

A user equipment (UE) configured to report Channel State Information (CSI) to a wireless network. The UE transmits a first sounding reference signal (SRS) on an uplink (UL) channel, receives a first channel state information reference signal (CSI-RS) on a downlink (DL) channel, wherein the first CSI-RS includes a first configuration of CSI-RS parameters based on the first SRS, performs first CSI-RS measurements based on the first configuration of CSI-RS parameters, transmits a first CSI report including the first CSI-RS measurements, transmits a second SRS on the UL channel, receives a second CSI-RS on the DL channel, wherein the second CSI-RS includes a second configuration of CSI-RS parameters based on the second SRS, performs second CSI-RS measurements based on the second configuration of (Continued)

CSI-reportConfig

NZP-CSI-RS-ResourceSet

NZP-CSI-RS-Resource 0 nrofPort = 8 — 502a

NZP-CSI-RS-Resource 1 nrofPort = 12 — 502b

NZP-CSI-RS-Resource 2 nrofPort = 16 — 502c

NZP-CSI-RS-Resource 3 nrofPort = 32 — 502d

CSI-RS parameters and transmits a second CSI report including the second CSI-RS measurements.

13 Claims, 4 Drawing Sheets

(56)                    References Cited

U.S. PATENT DOCUMENTS

| | | | | |
|---|---|---|---|---|
| 2019/0306850 | A1* | 10/2019 | Zhang ................... | H04L 5/0092 |
| 2020/0044802 | A1* | 2/2020 | Park ....................... | H04L 5/0048 |
| 2020/0220599 | A1* | 7/2020 | Xu ......................... | H04W 88/02 |
| 2020/0244413 | A1* | 7/2020 | Takeda ................... | H04L 5/0048 |
| 2020/0259625 | A1* | 8/2020 | Papasakellariou ... | H04B 7/0456 |
| 2021/0258991 | A1* | 8/2021 | Bao ...................... | H04L 25/0254 |
| 2023/0283341 | A1* | 9/2023 | Hajri ...................... | H04W 72/23 |
| | | | | 370/329 |
| 2023/0345259 | A1* | 10/2023 | Chung ................. | H04L 5/0051 |
| 2023/0379030 | A1* | 11/2023 | Sun ...................... | H04B 7/0632 |
| 2023/0412334 | A1* | 12/2023 | Sakhnini ............... | H04L 5/005 |
| 2024/0030984 | A1* | 1/2024 | Sun ...................... | H04B 7/0417 |

FOREIGN PATENT DOCUMENTS

| | | |
|---|---|---|
| EP | 3 337 053 | 6/2018 |
| WO | 2016/089124 | 6/2016 |
| WO | 2017/026762 | 2/2017 |
| WO | 2020/063729 | 4/2020 |

* cited by examiner

Method 400

1

TYPE II PORT SELECTION CODEBOOK ENHANCEMENTS

TECHNICAL FIELD

This application relates generally to wireless communication systems, and in particular relates to channel state information reporting.

BACKGROUND

In 5G new radio (NR) wireless communications, the 5G NR network may assign one or more frequency sub-bands to a user equipment (UE) to exchange information with the network. These sub-bands are allocated to the UE based on measured channel conditions that the UE reports to a next generation NodeB (gNB) of the network based on channel state information (CSI) measurements conducted by the UE on a CSI reference signal (CSI-RS). In time division duplex (TDD) communications, channel reciprocity may be used by the gNB to determine downlink (DL) channel conditions based on the CSI measurements provided by the UE for the uplink (UL) channel. 3GPP Release 15 and Release 16 provide a type II port selection codebook that exploits this channel reciprocity.

SUMMARY

Some exemplary embodiments are related to a user equipment (UE) having a transceiver configured to connect to a base station and a processor communicatively coupled to the transceiver and configured to perform operations. The operations include transmitting, to the base station, a first sounding reference signal (SRS) on an uplink (UL) channel, receiving, from the base station, a first channel state information reference signal (CSI-RS) on a downlink (DL) channel, wherein the first CSI-RS includes a first configuration of CSI-RS parameters based on the first SRS, performing first CSI-RS measurements based on the first configuration of CSI-RS parameters, transmitting, to the base station, a first CSI report including the first CSI-RS measurements, transmitting, to the base station, a second SRS on the UL channel, receiving, from the base station, a second CSI-RS on the DL channel, wherein the second CSI-RS includes a second configuration of CSI-RS parameters based on the second SRS, performing second CSI-RS measurements based on the second configuration of CSI-RS parameters and transmitting, to the base station, a second CSI report including the second CSI-RS measurements.

Other exemplary embodiments are related to one or more processors configured to perform operations. The operations include transmitting, to a base station of a wireless network, a first sounding reference signal (SRS) on an uplink (UL) channel, receiving, from the base station, a first channel state information reference signal (CSI-RS) on a downlink (DL) channel, wherein the first CSI-RS includes a first configuration of CSI-RS parameters based on the first SRS, performing first CSI-RS measurements based on the first configuration of CSI-RS parameters, transmitting, to the base station, a first CSI report including the first CSI-RS measurements, transmitting, to the base station, a second SRS on the UL channel, receiving, from the base station, a second CSI-RS on the DL channel, wherein the second CSI-RS includes a second configuration of CSI-RS parameters based on the second SRS, performing second CSI-RS measurements based on the second configuration of CSI-RS parameters and transmitting, to the base station, a second CSI report including the second CSI-RS measurements.

Still further exemplary embodiments are related to a method that includes transmitting, to a base station, a first sounding reference signal (SRS) on an uplink (UL) channel of a wireless network, receiving, from the base station, a first channel state information reference signal (CSI-RS) on a downlink (DL) channel, wherein the first CSI-RS includes a first configuration of CSI-RS parameters based on the first SRS, performing first CSI-RS measurements based on the first configuration of CSI-RS parameters, transmitting, to the base station, a first CSI report including the first CSI-RS measurements, transmitting, to the base station, a second SRS on the UL channel, receiving, from the base station, a second CSI-RS on the DL channel, wherein the second CSI-RS includes a second configuration of CSI-RS parameters based on the second SRS, performing second CSI-RS measurements based on the second configuration of CSI-RS parameters and transmitting, to the base station, a second CSI report including the second CSI-RS measurements.

DETAILED DESCRIPTION

Figure 1:
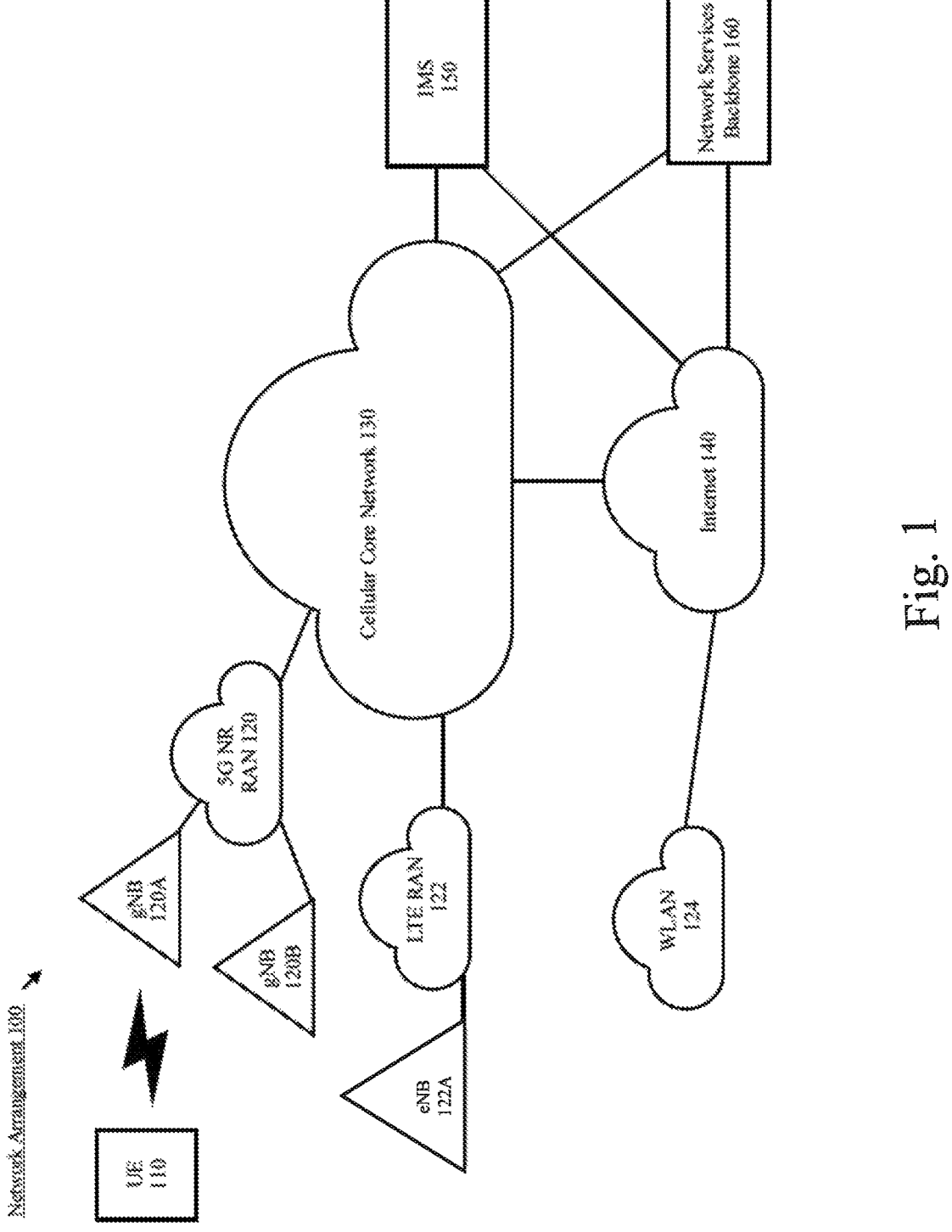
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for a 5G new radio (NR) network to improve channel state information (CSI) configuration of a user equipment (UE).

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

As noted above, TDD communications channel reciprocity may be used by the gNB to determine downlink (DL) channel conditions based on the CSI measurements provided by the UE for the uplink (UL) channel. Although exact reciprocity does not exist in frequency division duplexing (FDD) communications as it does in TDD, partial reciprocity may exist. For example, in FDD communications the angle of arrival/departure and the channel delay profile are similar between the UL and DL carriers. Currently, 5G NR communications do not exploit the partial reciprocity exhibited by FDD communications.

According to some exemplary embodiments, partial channel reciprocity in FDD is exploited to allow for CSI report reconfigurations to address a change in channel conditions and to reduce the overhead at the UE associated with performing CSI measurements.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
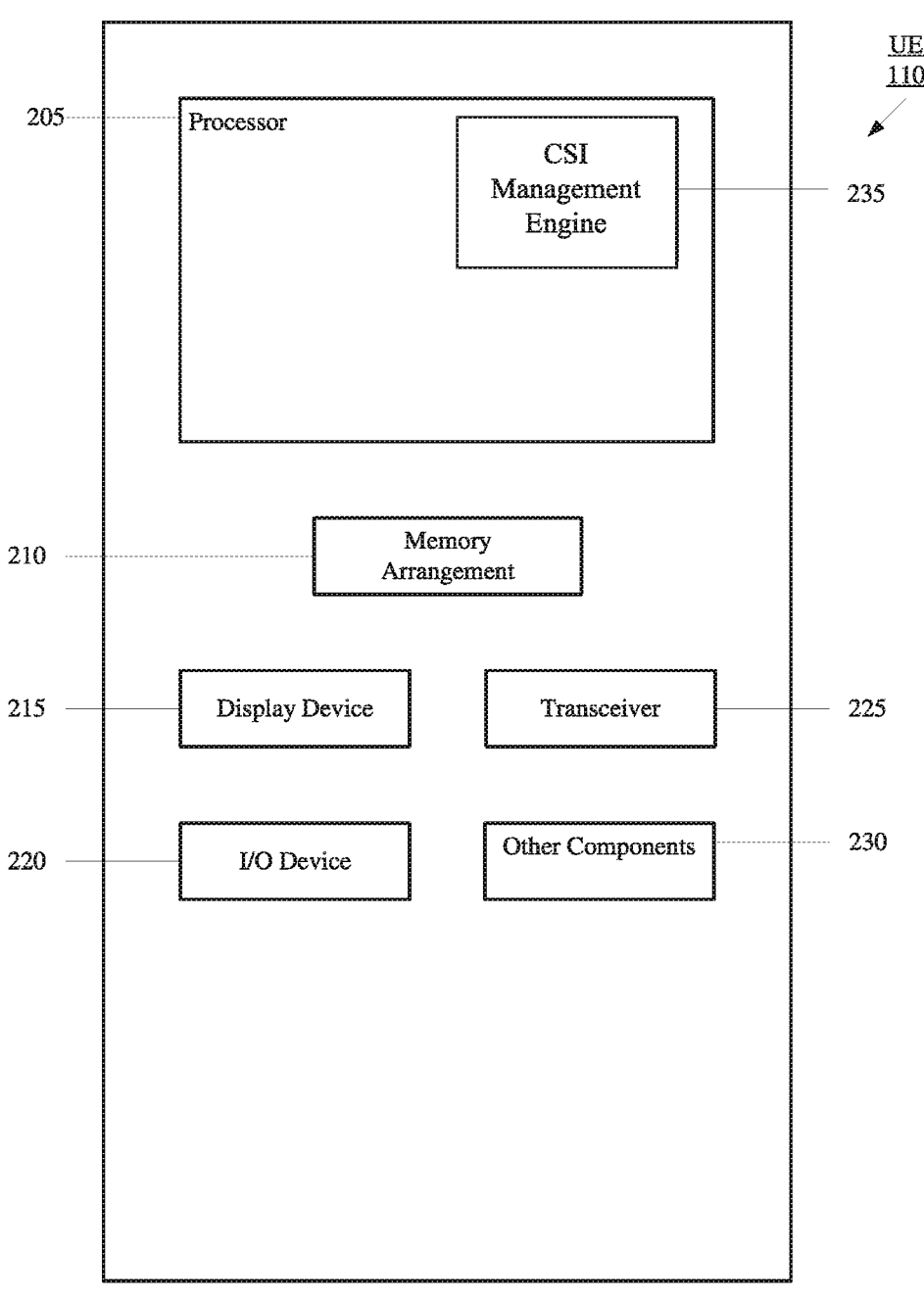
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a CSI management engine 235. The CSI management engine 235 may perform various operations related to performing CSI measurements on a channel and providing a CSI report back to the network (e.g., via the gNB).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
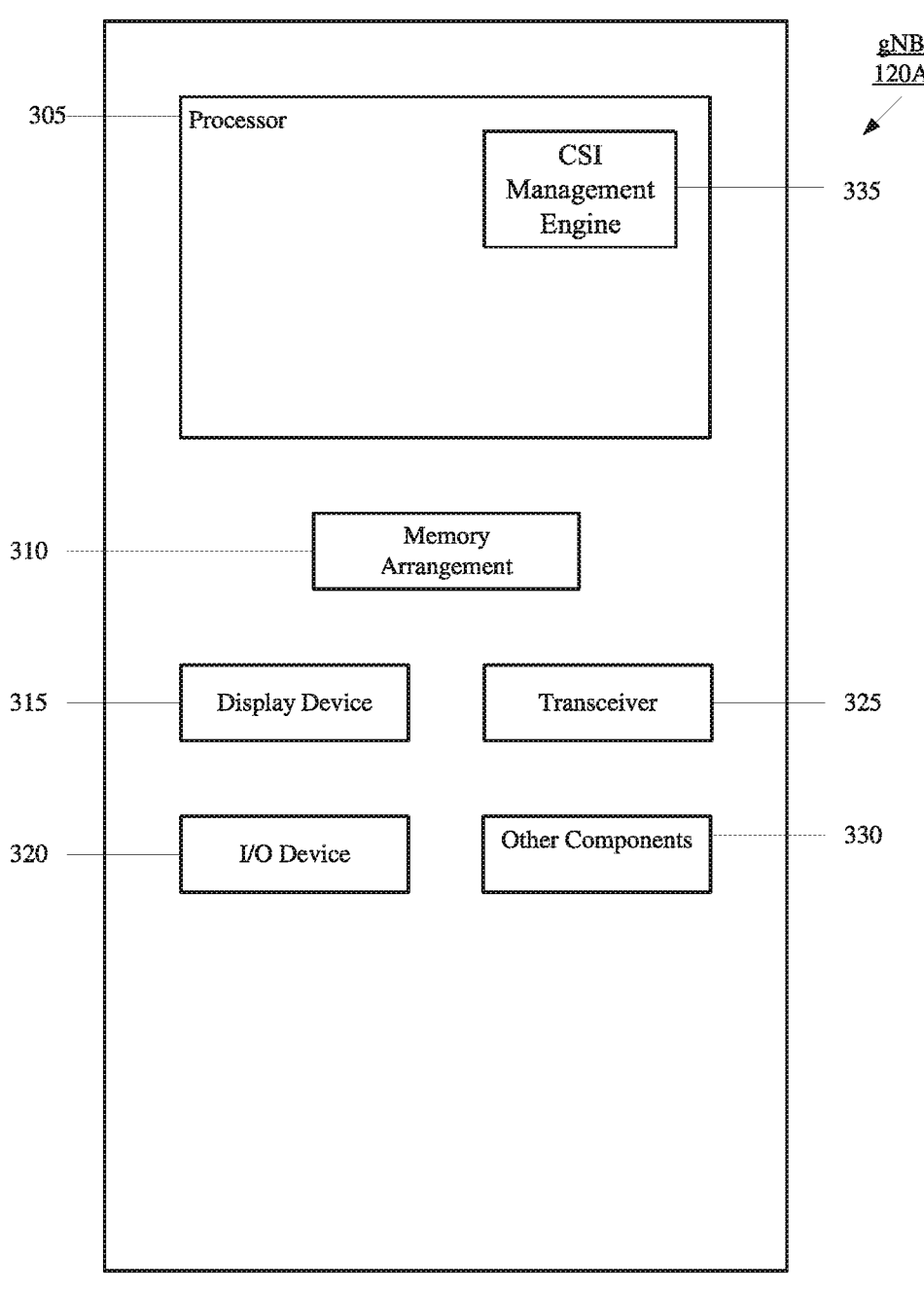
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a CSI management engine 335 for performing operations including reconfiguration of CSI resources for the UE 110 to use in conducting CSI measurements. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
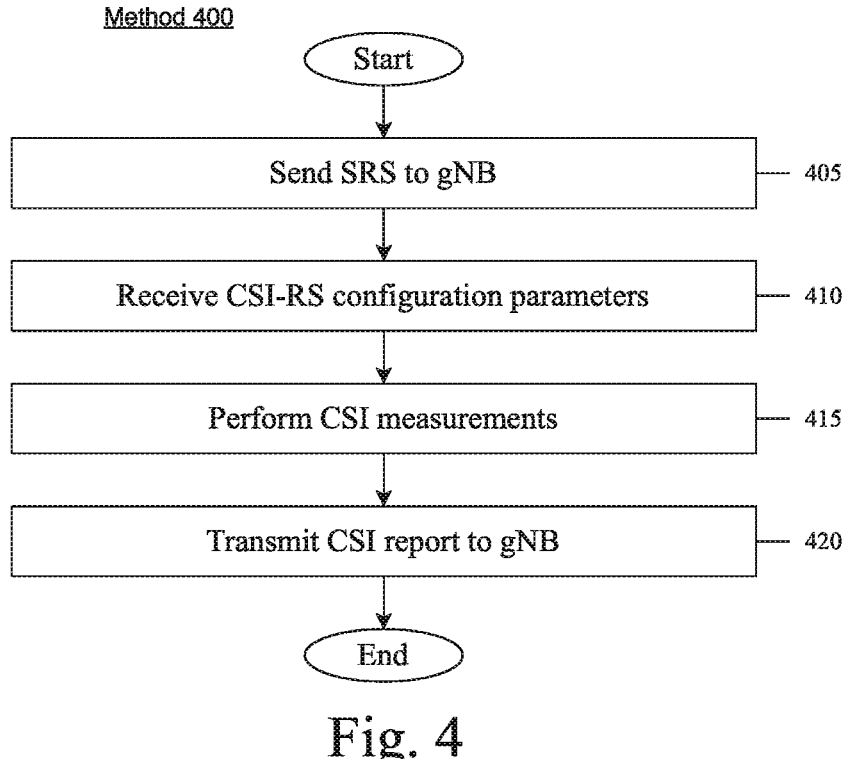
FIG. 4 shows a method of reconfiguring channel state information (CSI) resources according to various exemplary embodiments.

FIG. 4 shows a method 400 of reporting interference fluctuation according to various exemplary embodiments. At 405, the UE 110 sends a sounding reference signal (SRS) on the uplink (UL) channel to the gNB 120a (or 120b). Based on the SRS, the gNB 120a is apprised of the downlink (DL) channel due to partial reciprocity of the UL and DL channels. At 410, the UE 110 receives CSI reference signal (CSI-RS) configuration parameters from the gNB 120a.

In some exemplary embodiments, the CSI-RS configuration parameters may include CSI-RS resources in the non-zero power CSI-RS resource set (NZP-CSI-RS-Resource-Set). In such a scenario, a maximum number of M CSI-RS resources such as, for example, channel measurement resources (CMR) and/or interference measurement resources (IMR), may be configured by the gNB 120a via Radio Resource Control (RRC) signaling. Based on the SRS received at 405, the gNB 120a indicates to the UE 110 which of the of M CSI-RS resources should be used by the UE 110 to perform the CSI measurements. This indication of which of the M CSI-RS resources should be utilized may be carried out via medium access control control element (MAC-CE) or downlink control information (DCI) depending on whether the CSI-RS resource is a periodic (P-CSI) resource, semi-persistent (SP-CSI) resource, or aperiodic (AP-CSI) resource. For example, the MAC-CE may be used to indicate which of M CSI-RS resources should be used by the UE 110 in the case of P-CSI, SP-CSI, or AP-CSI. In some embodiments, DCI may alternatively be used in the case of AP-CSI.

In some exemplary embodiments, the CSI-RS configuration parameters may include the number of ports for each CSI-RS resource in the NZP-CSI-RS-ResourceSet. In such a scenario, a maximum number of N ports for each CSI-RS resource (e.g., CMR, IMR) may be configured by the gNB 120a via RRC. In some embodiments, the number of N ports is the same for each CSI-RS resource. Based on the SRS received at 405, the gNB 120a indicates to the UE 110 which of the of N ports for each of the CSI-RS resources should be used by the UE 110 to perform the CSI measurements. This indication of which of the N ports for each of the CSI-RS resources should be utilized may be carried out via MAC-CE or DCI depending on whether the CSI-RS resource is a P-CSI resource, SP-CSI resource, or AP-CSI resource. For example, MAC-CE may be used to indicate which of N ports for each of the CSI-RS resources should be used by the UE 110 in the case of P-CSI, SP-CSI, or AP-CSI. In some embodiments, DCI may alternatively be used in the case of AP-CSI.

Figure 5:
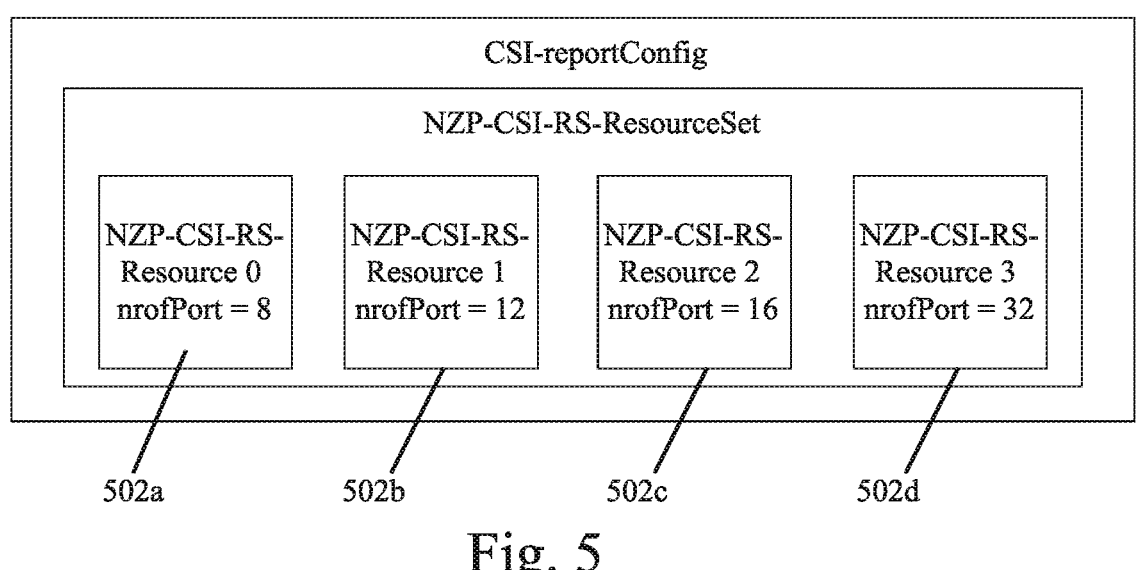
FIG. 5 shows an exemplary diagram illustrating a CSI resource configuration according to various exemplary embodiments.

In some exemplary embodiments, the CSI-RS configuration parameters may include CSI-RS resources in the NZP-CSI-RS-ResourceSet, each having a different number of ports, as illustrated in FIG. 5. In such a scenario, a maximum number of M CSI-RS resources (four shown in FIG. 5, 502a-d) may be configured by the gNB 120a via RRC. For each NZP-CSI-RS resource 502a-d, the gNB 120a may configure a different number of ports (nrofPorts). For example, as shown in FIG. 5, NZP-CSI-RS resource 502a is configured with 8 ports, NZP-CSI-RS resource 502b is configured with 12 ports, NZP-CSI-RS resource 502c is configured with 16 ports, and NZP-CSI-RS resource 502d is configured with 32 ports. Based on the SRS received at 405, the gNB 120a indicates to the UE 110 which of the of M CSI-RS resources should be used by the UE 110 to perform the CSI measurements. This indication of which of the M CSI-RS resources should be utilized may be carried out via MAC-CE or DCI depending on whether the CSI-RS resource is a P-CSI resource, SP-CSI resource, or AP-CSI resource. For example, MAC-CE may be used to indicate which of N ports for each of the CSI-RS resources should be used by the UE 110 in the case of P-CSI, SP-CSI, or AP-CSI. In some embodiments, DCI may alternatively be used in the case of AP-CSI. Since each resource has a different number of ports associated with that resource, activation of that resource also implicitly indicates the number of ports that should be utilized. It should be noted that FIG. 5 is illustrative and that the number of resources and ports may be different than shown in FIG. 5.

At 415, the UE 110 performs the CSI measurements based on the allocated CSI-RS resources. At 420, the UE 110 transmits the CSI report to the gNB 120a. As illustrated in FIG. 4, the method 400 may be repetitive (continuous). For example, the UE 110 continues to send the SRS on the UL channel to the gNB 120a. Based on the received SRS, the gNB 120a may change the configuration of the CSI-RS configuration parameters. When the UE 110 receives the updated parameters at 410, the UE 110 performs the CSI measurements based on the updated parameters at 415 and transmits the CSI report to the gNB at 420.

As part of the CSI reporting, the UE 110 reports a precoding matrix indicator (PMI) for each sub-band of the bandwidth part (BWP). The gNB may utilize channel reciprocity to estimate the channel frequency selectivity on the UL side and subsequently performs CSI sub-band precoding. The gNB 120a precodes each sub-band of the CSI differently so that when the UE receives the precoded channel, the precoded channel exhibits less frequency selectivity. That is, the gNB 120a compensates for the frequency selectivity of the channel at the gNB side to decrease the frequency selectivity at the UE side. As a result, the CSI reporting overhead is reduced at the UE 110. In other words, the gNB 120a detects the selectivity in the frequency domain on the UL channel and subsequently reverses this selectivity so that the channel appears significantly less frequency selective after the port selection CSI transmission at the UE side.

Typically, the UE 110 performs CSI reporting for each sub-band. In the 3GPP Release 15 and Release 16 type II port selection codebooks, wideband PMI reporting is not permitted. According to embodiments of the present disclosure, however, wideband PMI reporting may be utilized to reduce the overhead at the UE 110 when performing CSI measurements, namely, PMI reporting. In such a scenario, when "numberOfPMI-SubbandsPerCQI-Subband-r16=1," then the UE 110 reports one PMI for the entire BWP. When "numberOfPMI-SubbandsPerCQI-Subband-r16=2," then the UE 110 reports two PMIs for the entire BWP, one PMI for half of the BWP and another PMI for the other half of the BWP. In some embodiments, since 3GPP Release 15 and Release 16 type II port selection codebooks do not permit PMI sub-band reporting for BWPs having less than 24 physical resource blocks (PRBs), the wideband PMI reporting discussed above may be utilized for PMI reporting for BWPs having less than 24 PRBs. In such scenarios, only wideband PMI reporting is allowed (not sub-band PMI reporting).

In some exemplary embodiments, the CSI reporting overhead at the UE 110 may further or alternatively be reduced by allowing larger sub-band sizes for the BWP. In some embodiments, Table 5.2.1.4-2 of 3GPP 38.214 may be modified to include additional sub-band sizes shown in boldface in the table below.

| Bandwidth Part (PRBs) | Subband Size (PRBs) |
|---|---|
| 24-72 | 4, 8, 16, 32 |
| 73-144 | 8, 16, 32, 64, 144 |
| 145-275 | 16, 32, 64, 128, 275 |

To apprise the UE 110 of the updated table, the additional sub-band sizes used for CSI reporting can be communicated to the UE via RRC, MAC-CE, or DCI. As noted above, the UE 110 performs CSI reporting for each sub-band. By allowing larger sub-band sizes, the number of sub-bands are decreased, thus advantageously decreasing the number of CSI reports and associated overhead at the UE side.

In some embodiments, Table 5.2.1.4-2 of 3GPP 38.214 may be left as is and the gNB 120a may configure the CSI configuration so that the UE 110 uses a bundling factor K to bundle the sub-bands. K may have any desired value such as, for example, 1, 2, 4, 8, etc. and may be configured via RRC, MAC-CE, or DCI. After configuration, the UE 110 increases the sub-band size to the value configured by subbandSize in the CSI-ReportConfig multiplied by K. For example, if the subbandSize is configured to be 8 and K=2, then the result would be a sub-band size of 16. The UE 110 would then perform the CSI reporting based on the increased sub-band sizes. By increasing the sub-band sizes, the number of sub-bands are decreased, thus advantageously decreasing the number of CSI reports and associated overhead at the UE side.

According to the 3GPP Release 15 and Release 16 type II port selection codebooks, a number of ports (L) (L=1, 2, or 4) are consecutively selected every d ports (d=1, 2, 3, 4). For example, 4 consecutive ports may be selected beginning every 3 ports. As a result, 4 consecutive ports may be selected beginning with port 0, 3, 6, etc. In some exemplary embodiments, the CSI reporting overhead at the UE 110 may further or alternatively be reduced by increasing the number of d ports so that L consecutive ports may be selected every d ports, where d can have values greater than 4 (e.g., 5, 6, etc.). As a result, the number of possible selections of L consecutive ports is decreased due to the increased restriction on the starting port, which advantageously decreases the processing overhead at the UE side when determining which ports should be used in the CSI reporting.

According to the 3GPP Release 15 and Release 16 type II port selection codebooks, port selection is determined based on the following equation $$
\underbrace{\left[w^\ell(1)\ \ldots\ w^\ell(N_3)\right]}_{W^\ell} = \left(\overbrace{\begin{matrix} v_0\ \cdots\ v_{L-1} & \\ & v_0\ \cdots\ v_{L-1} \end{matrix}}^{2L}\right)\underbrace{\overbrace{\begin{pmatrix} \tilde{c}_{0,1,\ell} & \cdots & \tilde{c}_{0,M,\ell} \\ \vdots & \ddots & \vdots \\ \tilde{c}_{2L-1,1,\ell} & \cdots & \tilde{c}_{2L-1,M,\ell} \end{pmatrix}}^{M}}_{W_2^\ell}\underbrace{\begin{pmatrix} w_{f,1}^H \\ \vdots \\ w_{f,M}^H \end{pmatrix}}_{W_f^H}
$$

where $W_1$ is the port selection matrix, $W_2^\ell$ is the compressed coefficient matrix, and $$
W_f^H
$$

is the frequency basis matrix. Currently, CSI type II port selection includes reporting of $W_1$, $W_2$, $W_f$, and the channel quality indicator (CQI). In some embodiments, the CSI reporting overhead at the UE 110 may further or alternatively be reduced by allowing the UE 110 to report one or a subset of these four values when partial channel reciprocity exists. When the gNB 120a determines a precoder for the PMI for a channel that does not exhibit much change, then the UE 110 does not need to report all of the $W_1$, $W_2$, $W_f$, and the CQI. Instead, the UE 110 may report one or a subset of these values. For example, if the gNB 120a determines a precoder for the PMI for a channel that does not exhibit much change but channel fading occurs, then $W_1$ and $W_f$ remain relatively unchanged and the UE 110 may only report $W_2$ and the CQI or just $W_2$.

In some exemplary embodiments, the gNB 120*a* may select a subset of the N3 (19 or 38 sub-bands) frequency bases for frequency domain CSI feedback overhead compression. By choosing a subset of the N3 frequency bases, the CSI reporting overhead and computational complexity at the UE 110 is advantageously reduced. For example, the gNB 120*a* may instruct the UE 110 not to perform CSI measurements on some of the N3 frequency bases that corresponds to highly-frequency-selective component of the channel.

In some exemplary embodiments, the UE 110 may additionally provide noise feedback to the gNB 120*a* with the SRS (e.g., at 405). When the number of transmission antenna is equal to the number of reception antenna, in some embodiments, the UE 110 may provide the noise feedback to the gNB 120*a* implicitly by performing noise whitening. This noise whitening is achieved by measuring the noise covariance matrix $R_{nn}$ and using inverted square root $$\left(R_{nn}^{-1/2}\right)$$

of the noise covariance matrix as a precoder when precoding the SRS. After the gNB 120*a* decodes the SRS, the gNB 120*a* is aware of the channel condition (the noise).

In some exemplary embodiments, the UE 110 may provide the noise feedback to the gNB 120*a* explicitly by feeding back the $R_{nn}$ to the gNB 120*a*. In some embodiments, the UE 110 may compress the $R_{nn}$ due to the large size of the matrix. Since the $R_{nn}$ is a positive semi-definite Hermitian matrix $$\left((R_{nn})_{i,j} = (R_{nn})_{i,j}^{*}\right),$$

in some embodiments, the UE 110 may quantize and feedback only the lower (or upper) triangular part of the $R_{nn}$ to the gNB 120*a*. Alternatively, the UE 110 may decompose the $R_{nn}$ using single value decomposition (SVD) as $(R_{nn})_{i,j}=U*\Lambda*U'$, where $\Lambda$ is diagonal matrix with non-negative diagonal entries and U is a unitary orthogonal matrix. In such a scenario, the UE 110 only quantizes and feeds back the diagonal entries of $\Lambda$. The U may either be quantized or approximated by selecting a predefined orthogonal basis.

Examples

In a first example, a user equipment (UE) comprises a transceiver configured to connect to a base station and a processor communicatively coupled to the transceiver and configured to perform operations comprising receiving, from the base station, a channel state information reference signal (CSI-RS) on a downlink (DL) channel, wherein the CSI-RS includes a configuration of CSI-RS parameters, and wherein the CSI-RS has a configured bandwidth part (BWP) of less than 24 physical resource blocks (PRBs), determining a precoding matrix indicator (PMI) based on the CSI-RS and transmitting, to the base station, a CSI report including the PMI, wherein the PMI is a wideband PMI.

In a second example, the UE of the first example, wherein the operations further comprise determining a wideband channel quality indicator (CQI) based on the CSI-RS, wherein the CSI report further includes the wideband CQI.

In a third example, the UE of the first example, wherein Channel State Information (CSI) is determined based on 3GPP Release 15 type II port selection codebook.

In a fourth example, the UE of the first example, wherein Channel State Information (CSI) is determined based on 3GPP Release 16 enhanced type II port selection codebook.

In a fifth example, a base station of a wireless network comprises a transceiver configured to connect to a user equipment (UE) and a processor communicatively coupled to the transceiver and configured to perform operations comprising configuring a bandwidth part (BWP) for a channel state information reference signal (CSI-RS), wherein the CSI-RS includes a CSI report configuration, configuring a sub-band size, wherein the configured sub-band size is part of the CSI report configuration, and wherein the configured sub-band size is between 4 and 275 physical resource blocks (PRB), transmitting the CSI-RS to the UE and receiving a CSI report from the UE based on the CSI-RS.

In a sixth example, the base station of the fifth example, wherein the configured sub-band size is selected from at least three sub-band sizes.

In a seventh example, the base station of the fifth example, wherein the configured sub-band size is based on a bundling factor multiplied by a predefined sub-band size value.

In an eighth example, a base station of a 5G new radio (NR) wireless network, comprising a transceiver configured to connect to a user equipment (UE) and a processor communicatively coupled to the transceiver and configured to perform operations comprising configuring a channel state information reference signal (CSI-RS), transmitting the CSI-RS to the UE and receiving a CSI report from the UE based on the CSI-RS, wherein the CSI report indicates a selection of one or more consecutive CSI-RS ports, wherein a first one of the one or more consecutive CSI-RS ports is the first, second, third, fourth, fifth, or sixth CSI-RS port.

In a ninth example, the base station of the eighth example, wherein the one or more consecutive CSI-RS ports are selected with wrap around.

In a tenth example, a user equipment (UE) comprises a transceiver configured to connect to a base station and a processor communicatively coupled to the transceiver and configured to perform operations comprising transmitting, to the base station, a sounding reference signal (SRS) on an uplink (UL) channel, receiving, from the base station, a channel state information reference signal (CSI-RS) on a downlink (DL) channel, wherein the CSI-RS includes a configuration of CSI-RS ports, performing CSI-RS measurements on the CSI-RS and transmitting, to the base station, a CSI report including the CSI-RS measurements, wherein the CSI report includes a subset of 3GPP Release 16 type II port selection parameters, and wherein the 3GPP Release 16 type II port selection parameters include a spatial basis selection matrix, a frequency basis selection matrix, a compression coefficient combination matrix, and a channel quality indicator.

In an eleventh example, the UE of the tenth example, wherein the subset includes one of the 3GPP Release 16 type II port selection parameters.

In a twelfth example, a user equipment (UE) comprises a transceiver configured to connect to a base station and a processor communicatively coupled to the transceiver and configured to perform operations comprising determining a noise covariance feedback associated with a downlink (DL) channel and transmitting, to the base station, a sounding reference signal (SRS) on the UL channel, wherein the SRS includes the noise covariance feedback.

In a thirteenth example, the UE of the twelfth example, wherein the noise covariance feedback is based on a noise covariance matrix (Rnn).

In a fourteenth example, the UE of the thirteenth example, wherein the operations further comprise applying an inverted square root of the noise covariance matrix ($R\_nn^{(-\frac{1}{2})}$) to the SRS to whiten noise on the UL channel.

In a fifteenth example, the UE of the thirteenth example, wherein the operations further comprise compressing the noise covariance matrix (Rnn) to obtain a compressed noise covariance matrix and transmitting the compressed noise covariance matrix to the base station.

In a sixteenth example, the UE of the fifteenth example, wherein compressing the noise covariance matrix includes quantizing the noise covariance matrix and transmitting one of the lower or upper triangular portion of the quantized noise covariance matrix to the base station.

In a seventeenth example, the UE of the fifteenth example, wherein compressing the noise covariance matrix includes decomposing the noise covariance matrix using single value decomposition (SVD) to obtain a diagonal matrix having non-negative diagonal entries and a unitary orthogonal matrix, quantizing the non-negative diagonal entries of the diagonal matrix and transmitting the quantized non-negative diagonal entries of the diagonal matrix to the base station.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:
a transceiver configured to connect to a base station; and
a processor communicatively coupled to the transceiver and configured to perform operations comprising:
receiving a radio resource control (RRC) transmission configuring a maximum number of nonzero power channel state information reference signal (NZP-CSI-RS) resources;
transmitting, to the base station, a first sounding reference signal (SRS) on an uplink (UL) channel;
receiving, from the base station, a first CSI-RS on a downlink (DL) channel, wherein the first CSI-RS includes a first configuration of CSI-RS parameters based on the first SRS, and wherein the first configuration of CSI-RS parameters includes a first number of NZP-CSI-RS resources;
performing first CSI-RS measurements based on the first configuration of CSI-RS parameters;
transmitting, to the base station, a first CSI report including the first CSI-RS measurements;
transmitting, to the base station, a second SRS on the UL channel;
receiving, from the base station, a second CSI-RS on the DL channel, wherein the second CSI-RS includes a second configuration of CSI-RS parameters based on the second SRS, wherein the second configuration of CSI-RS parameters includes a second number of NZP-CSI-RS resources different than the first number of NZP-CSI-RS resources, wherein the second configuration is received via one of a medium access control control element (MAC-CE) transmission or a downlink control information (DCI) transmission, and wherein the second number of NZP-CSI-RS resources is a subset of the maximum number of NZP-CSI-RS resources;
performing second CSI-RS measurements based on the second configuration of CSI-RS parameters; and
transmitting, to the base station, a second CSI report including the second CSI-RS measurements.

2. The UE of claim 1, wherein each of the first number of NZP-CSI-RS resources includes a different number of ports, and wherein each of the second number of NZP-CSI-RS resources includes a different number of ports.

3. The UE of claim 1, wherein the first configuration of CSI-RS parameters includes a first number of ports for each CSI-RS resource and the second configuration of CSI-RS parameters includes a second number of ports for each CSI-RS resource, and wherein the first number of ports is different than the second number of ports.

4. The UE of claim 3, wherein the second number of ports is the same for each CSI-RS resource.

5. The UE of claim 3, wherein the operations further comprise:
receiving a radio resource control (RRC) transmission configuring a maximum number of ports.

6. The UE of claim 5, wherein the second configuration is received via one of a MAC-CE transmission or DCI transmission, and wherein the second number of ports is a subset of the maximum number of ports.

7. One or more processors configured to perform operations comprising:
receiving a radio resource control (RRC) transmission configuring a maximum number of nonzero power channel state information reference signal (NZP-CSI-RS) resources;
transmitting, to a base station of a wireless network, a first sounding reference signal (SRS) on an uplink (UL) channel;

receiving, from the base station, a first CSI-RS on a downlink (DL) channel, wherein the first CSI-RS includes a first configuration of CSI-RS parameters based on the first SRS, and wherein the first configuration of CSI-RS parameters includes a first number of NZP-CSI-RS resources;

performing first CSI-RS measurements based on the first configuration of CSI-RS parameters;

transmitting, to the base station, a first CSI report including the first CSI-RS measurements;

transmitting, to the base station, a second SRS on the UL channel;

receiving, from the base station, a second CSI-RS on the DL channel, wherein the second CSI-RS includes a second configuration of CSI-RS parameters based on the second SRS, wherein the second configuration of CSI-RS parameters includes a second number of NZP-CSI-RS resources different than the first number of NZP-CSI-RS resources, wherein the second configuration is received via one of a medium access control control element (MAC-CE) transmission or a downlink control information (DCI) transmission, and wherein the second number of NZP-CSI-RS resources is a subset of the maximum number of NZP-CSI-RS resources;

performing second CSI-RS measurements based on the second configuration of CSI-RS parameters; and transmitting, to the base station, a second CSI report including the second CSI-RS measurements.

8. The one or more processors of claim 7, wherein each of the first number of NZP-CSI-RS resources includes a different number of ports, and wherein each of the second number of NZP-CSI-RS resources includes a different number of ports.

9. The one or more processors of claim 7, wherein the first configuration of CSI-RS parameters includes a first number of ports for each CSI-RS resource and the second configuration of CSI-RS parameters includes a second number of ports for each CSI-RS resource, and wherein the first number of ports is different than the second number of ports.

10. The one or more processors of claim 9, wherein the second number of ports is the same for each CSI-RS resource.

11. The one or more processors of claim 9, wherein the operations further comprise:

receiving a radio resource control (RRC) transmission configuring a maximum number of ports.

12. The one or more processors of claim 11, wherein the second configuration is received via one of a MAC-CE transmission or DCI transmission, and wherein the second number of ports is a subset of the maximum number of ports.

13. A method, comprising:

receiving a radio resource control (RRC) transmission configuring a maximum number of nonzero power channel state information reference signal (NZP-CSI-RS) resources;

transmitting, to a base station, a first sounding reference signal (SRS) on an uplink (UL) channel of a wireless network;

receiving, from the base station, a first CSI-RS on a downlink (DL) channel, wherein the first CSI-RS includes a first configuration of CSI-RS parameters based on the first SRS, and wherein the first configuration of CSI-RS parameters includes a first number of NZP-CSI-RS resources;

performing first CSI-RS measurements based on the first configuration of CSI-RS parameters;

transmitting, to the base station, a first CSI report including the first CSI-RS measurements;

transmitting, to the base station, a second SRS on the UL channel;

receiving, from the base station, a second CSI-RS on the DL channel, wherein the second CSI-RS includes a second configuration of CSI-RS parameters based on the second SRS, wherein the second configuration of CSI-RS parameters includes a second number of NZP-CSI-RS resources different than the first number of NZP-CSI-RS resources, wherein the second configuration is received via one of a medium access control control element (MAC-CE) transmission or a downlink control information (DCI) transmission, and wherein the second number of NZP-CSI-RS resources is a subset of the maximum number of NZP-CSI-RS resources;

performing second CSI-RS measurements based on the second configuration of CSI-RS parameters; and transmitting, to the base station, a second CSI report including the second CSI-RS measurements.

* * * * *